Aug. 11, 1953  G. M. SCHIEDEL  2,648,817
CUTOUT INSPECTION DEVICE
Filed Nov. 2, 1949
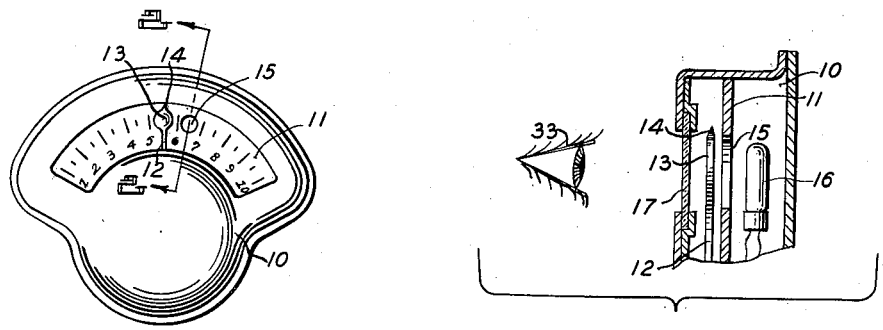
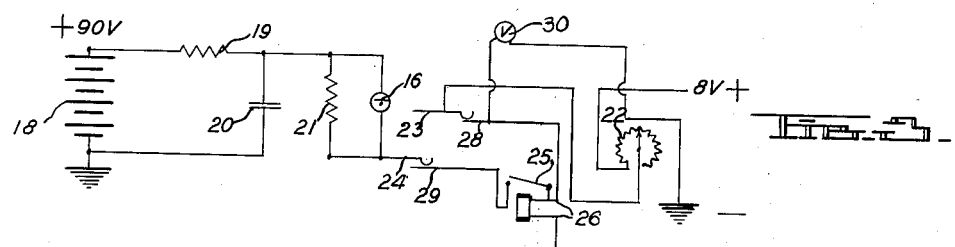
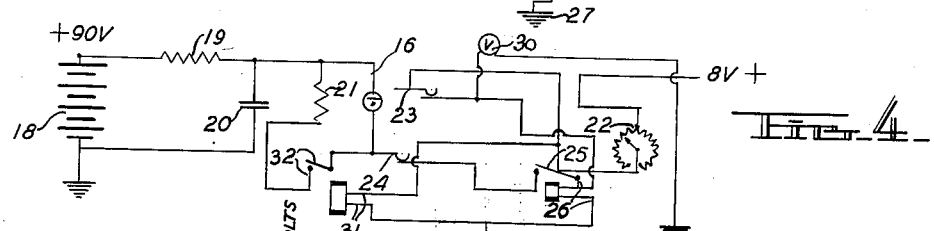
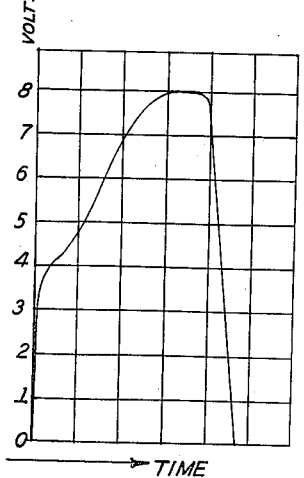
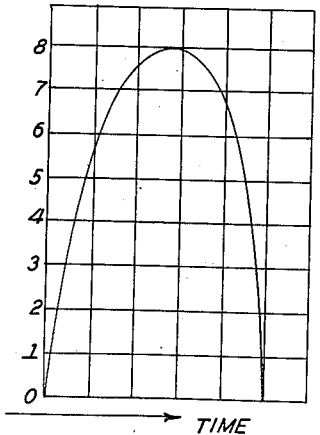
G. M. SCHIEDEL
INVENTOR.
BY E. C. McRae
J. R. Faulkner
T. H. Oster
ATTORNEYS Patented Aug. 11, 1953

2,648,817

UNITED STATES PATENT OFFICE 2,648,817

CUTOUT INSPECTION DEVICE

George Milton Schiedel, Ypsilanti, Mich., assignor to Ford Motor Company, Dearborn, Mich., a corporation of Delaware Application November 2, 1949, Serial No. 125,147

6 Claims. (Cl. 324—28)

This invention is concerned with an apparatus useful in the production of electrical components, and more particularly with a device adapted to the repetitious adjustment and inspection of identical relays.

This apparatus has been specifically developed to aid in the production adjustment and inspection of automotive generator cut out relays. The sole function of these cut out relays is to insure against the discharging of the battery through the generator when the generator is at rest or when it is rotating too slowly to generate a voltage equal to that of the battery. The usual generator cut out relay is actuated by two separate coils. One of these coils consists of a large number of turns of fine wire having a high resistance. This high resistance coil is permanently connected between the output terminal of the generator and the ground. The other coil comprises relatively few turns of coarse wire so connected that the charging current from the generator flows through it. These two coils are wound on a common core and so conected that their magnetic effects are cumulative when current is flowing in a direction to charge the battery and are subtractive when the current is flowing in a direction to discharge the battery.

The high resistance shunt coil is arranged so that it will actuate the generator cut out relay and connect the generator to the battery whenever the generator voltage rises to a point a few tenths of a volt above the normal battery voltage. With the usual six volt storage battery, the generator cut out relay would be set to close at approximately six and one half volts.

Due to inevitable irregularities in manufacture it has been found to be necessary to individually adjust and calibrate each generator cut out relay to insure that it closes and opens within the specified voltage ranges. These adjustments are made by increasing or decreasing the tension on the spring which opens the relay contact points. In making such adjustments, the operator connects the terminal of the generator cut out which in service is connected to the generator to one terminal of a source of direct current energy which is readily adjustable as to voltage. The frame of the generator cut out relay is connected to the other terminal of the direct current source. In service this would be the body of the vehicle. The operator then proceeds to increase the direct current voltage impressed across the generator cut out relay until the relay is actuated, and notes the voltage at which this occurs. If the actuating voltage is not within the specified range, the spring tension of the relay is adjusted and again checked with the varying voltage. This process is repeated until the proper closing voltage is obtained. This adjustment and inspection procedure requires the operator to adjust the direct current voltage by means of a rheostat, observe the action of the generator relay cut out and simultaneously observe a meter which is used to measure the direct current voltage. This multiplicity of operations has made the adjustment and inspection of generator cut out relays a time consuming and expensive operation subject to operator and meter response time errors.

Accordingly it is one object of this invention to provide an apparatus for expediting the adjustment and inspection of generator cut out relays.

It is a further object of this invention to reduce to a minimum the manual effort and attention required for this inspection and adjustment operation.

It is a further object of this invention to provide a generator cut out inspection apparatus which will without additional effort on the part of the operator check the generator cut out opening voltage as well as the closing voltage.

With these and other objects in view, the invention comprises the arrangements, constructions and combinations of the various elements of the structure described in the specification, claimed in the claims and illustrated in the accompanying drawings in which:

Figure 1 is an elevation of a standard voltmeter which has been modified for incorporation into the generator cut out checking apparatus.

Figure 2 is a view partially in section showing the voltmeter of Figure 1 sectioned along the line 2—2 of Figure 1 and the position of the operator with relation to the voltmeter.

Figure 3 is a diagram of an electric circuit useful in the generator cut out inspection apparatus.

Figure 4 is a diagram of another electric circuit useful in the generator cut out inspection apparatus.

Figure 5 is a graph of voltage against time in which the time-voltage curve is particularly adapted to the circuit shown in Figure 3.

Figure 6 is a graph of voltage against time in which the time-voltage curve is particularly adapted to the circuit shown in Figure 4.

Figure 1 shows a conventional large size voltmeter adapted to the present invention. The body of the voltmeter is represented at 10, the voltmeter scale at 11 and the indicating pointer at 12. Pointer 12 is provided with the conventional enlarged section 13 (flag) and point 14, both of which travel over scale 11. Aperture 15 is drilled in scale 11 with its center at the six and one half volt mark, or any other value at which it is desired to have the generator cut out relay close. Aperture 15 is so located that when the pointer 12 indicated six and one half volts, aperture 15 is completely obscured by enlarged section 13. The ratio of the drilled hole size to the meter flag size governs the tolerance allowed the operator, i. e. the larger the hole size the tighter the tolerance.

Figure 2 is a representation, partially in section including that portion of the voltmeter encircled in Figure 1. This section is taken on the line 2—2 of Figure 1. In Figure 2, neon lamp 16 is shown mounted back of scale 11 and in alignment with aperture 15 in scale 11. Pointer 12 and cover glass 17 are shown arrayed in front of the scale 11. The numeral 33 designates the eye of the observer which is aligned with neon lamp 16 and aperture 15.

Figure 3 is a diagram of an electrical circuit which has been used in the generator cut out adjustment and inspection device. Figure 3 shows neon lamp 16 energized by B battery 18 which generates a potential of 90 volts. Resistor 19 having a value of 150,000 ohms is inserted in the circuit in series with the B battery and the capacitor. Resistor 21 having a value of 100,000 ohms is shunted across neon lamp 16. Capacitor 20 having a capacity of 0.25 microfarad is charged by B battery 18 through resistor 19 and serves as a reservoir of energy to flash neon lamp 16.

Variable rheostat 22 is shown with the one end of the resistance element connected across a source of direct current supplied conveniently at eight volts. Contactor 23 is connected to the movable portion of variable rheostat 22. Variable rheostat 22 is preferably driven by an electric motor (not shown) so that it will impress a variable potential between contactor 23 and ground, which potential will vary in a regular manner. Contactor 24 is connected to the terminals of neon lamp 16 and resistor 21 on the side remote from capacitor 20. Contact points 25 are actuated by coil 26 and coil 26 is grounded at ground 27. Terminals 28 and 29 are integral parts of the generator cut out relay being tested and in use are intended to be connected respectively to the generator and battery. It is to be understood that contact points 25 and coil 26 are also permanent parts of the generator cut out relay being tested. Voltmeter 30 which of course includes body 10, scale 11, pointer 12, enlarged section 13, point 14 and aperture 15 is connected as shown so that it indicates the voltage impressed across coil 26.

In Figure 5 there is presented a graphical representation of the time voltage relationship established by the action of variable rheostat 22. It will be seen that the voltage impressed across coil 26 rises sharply from a low value to a value of about four volts and more gradually to a peak value of eight volts and is then removed. A typical time for a complete cycle is 1⅓ seconds.

In testing a generator cut out relay the relay is placed in a fixture so that terminals 28 and 29 are held firmly in position against contactors 23 and 24. This causes the voltage enanating from variable rheostat 22 to be impressed across coil 26 of the generator cut out relay under test. As this voltage reaches a certain value, coil 26 will actuate the generator cut out relay and close contact points 25. The closing of contact points 25 provides a path to ground for the charge on capacitor 20 through neon lamp 16 shunted by resistor 21 and results in a single short duration flash of light from this neon lamp. As the voltage emanating from variable rheostat 22 changes, pointer 12 of voltmeter 30 moves across scale 11 in synchrony with such changes. If the adjustment of the generator cut out relay is correct, the contact points 25 will close and neon lamp 16 will flash when enlarged section 13 of pointer 12 is directly in front of aperture 15. In this manner, the flash of light from neon lamp 16 will be obscured by the pointer enlarged section (flag) 13 and will not be visible to the operator. Thus the operator can assume that any generator cut out relay which under test obscures the flash of neon light is operating at the correct voltage level. When the operator observes the neon light flash, it is an indication that the generator cut out relay is operating at an incorrect voltage level and must be adjusted. As the cycle of operation of the variable rheostat 22 is only 1⅓ seconds, an improperly operating generator cut out relay can be quickly adjusted and again checked without removing it from the fixture.

Figure 4 is a diagram of an electric circuit also suitable for use in checking generator cut out relays. This circuit will be seen to be similar to that shown in Figure 3 except that there has been incorporated into the circuit in Figure 4 a carefully calibrated relay the coil of which is represented at 31 and the contact points at 32. The calibrated relay is used as a standard which always opens its contact at a point on the variable potential curve chosen to suit the particular relays to be tested. By a judicious choice of the constants of the circuits it is possible to cause the neon lamp to flash once only if the standard relay closes before the relay on test and the relay on test closes within a predetermined time interval afterwards. If the relay on test closes first the neon lamp will flash rapidly and repeatedly. By these indications the operator can be informed as to the closing point of the relay under test, and by adjusting the relay to get only a single flash from the neon lamp, can be assured of a correctly adjusted relay.

Figure 6 is similar to Figure 5 and shows a modification of the voltage time relationship established by variable resistor 22 in order to permit a more gradual decay of the voltage after the peak value has been reached.

I claim as my invention:

1. A relay testing device comprising an electric meter, said electric meter being provided with an indicating hand, a scale, an opening through the scale and a neon bulb located so as to be viewed through said opening in the scale, means for receiving the relay to be tested, means for applying a varying potential to the operating coil of the relay, means for generating an electrical impulse upon operation of the relay being tested and electrical connection to energize the neon bulb by said impulse.

2. A relay testing device comprising an electric meter, said electric meter being provided with an indicating hand, a scale, an opening through the scale, and a neon bulb located so as to be viewed through said opening in the scale, means for receiving the relay to be tested, means for applying a varying potential to the operating coil of the relay, means for generating an electrical impulse upon the operation of the relay being tested, and electrical connections to energize the neon bulb by said impulse, said neon bulb being shunted by a standard relay and a resistance in series, the operating coil of said standard relay being energized by the same voltage which energizes the relay to be tested.

3. A relay testing device comprising a neon bulb, means for receiving the relay to be tested, means for applying a varying potential to the operating coil of the relay, means for generating an electrical impulse upon the operation of the relay being tested, and electrical connections to energize the neon bulb by said impulse, said neon bulb being shunted by a standard relay and a resistance in series, the operating coil of said standard relay being energized by the same voltage which energizes the relay to be tested.

4. A relay testing device comprising an electric meter, said electric meter being provided with an indicating hand, a scale, an opening through the scale and a neon bulb located so as to be viewed through said opening in the scale, means for receiving the relay to be tested, a variable rheostat for applying a varying potential to the operating coil of the relay, means for generating an electrical impulse upon operation of the relay being tested and an electrical connection to energize the neon bulb by said impulse.

5. A relay testing device comprising an electric meter, said electric meter being provided with an indicating hand, a scale, an opening through the scale and a neon bulb located so as to be viewed through said opening in the scale, means for receiving the relay to be tested, means for applying a varying potential to the operating coil of the relay, said neon bulb being a portion of a circuit comprising a series connection of a source of energy adequate to operate the neon bulb, a limiting resistor, the neon bulb and the contact points of the relay being tested, a second resistor being shunted across the bulb, and a capacitor connected in a series with the energy source and the limiting resistor, the connection to the limiting resistor being on the side remote from the energy source.

6. A relay testing device comprising an electric meter, said electric meter being provided with an indicating hand, a scale, an opening through the scale and a neon bulb located so as to be viewed through said opening in the scale, means for receiving the relay to be tested, a variable rheostat for applying a varying potential to the operating coil of the relay, said neon bulb being a portion of a circuit comprising a series connection of a source of energy adequate to operate the neon bulb, a limiting resistor, the neon bulb and the contact points of the relay being tested, a second resistor being shunted across the bulb, and a capacitor connected in series with the energy source and the limiting resistor, the connection to the limiting resistor being on the side remote from the energy source.

GEORGE MILTON SCHIEDEL.

References Cited in the file of this patent

UNITED STATES PATENTS

| Number | Name | Date |
|---|---|---|
| 2,144,873 | Dimond | Jan. 24, 1939 |
| 2,432,453 | Skellett | Dec. 9, 1947 |
| 2,496,622 | Dubuar | Feb. 7, 1950 |

FOREIGN PATENTS

| Number | Country | Date |
|---|---|---|
| 313,208 | Great Britain | June 10, 1929 |